United States Patent
Amann et al.

(10) Patent No.: US 8,171,282 B2
(45) Date of Patent: May 1, 2012

(54) ENCRYPTION DATA INTEGRITY CHECK WITH DUAL PARALLEL ENCRYPTION ENGINES

(75) Inventors: Stefan Amann, Holzgerlingen (DE); Gerhard Banzhaf, Nufringen (DE); Kenneth W. Boyd, Tucson, AZ (US); Daniel F. Casper, Poughkeepsie, NY (US); John R. Flanagan, Poughkeepsie, NY (US); Jeffrey W. Palm, Rochester, MN (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/940,496

(22) Filed: Nov. 15, 2007

(65) Prior Publication Data

US 2009/0132802 A1 May 21, 2009

(51) Int. Cl.
*H04L 9/00* (2006.01)
*H04L 9/16* (2006.01)
*G06F 11/07* (2006.01)
*H03M 13/09* (2006.01)
*H04K 1/00* (2006.01)
*H04K 1/04* (2006.01)
*H04L 9/06* (2006.01)

(52) U.S. Cl. .......... 713/150; 713/171; 713/193; 714/49; 380/37; 380/44

(58) Field of Classification Search .................. 713/150, 713/193; 714/49; 380/44, 37
See application file for complete search history.

(56) References Cited

U.S. PATENT DOCUMENTS
2009/0327818 A1* 12/2009 Kogelnik .................. 714/49

FOREIGN PATENT DOCUMENTS
WO    WO 9908411 A2 *  2/1999

OTHER PUBLICATIONS

K. Tiri, D. Hwang, A. Hodjat, B. Lai, S. Yang, P. Schaumont, I. Verbauwhede; "A side-channel leakage free coprocessor IC in 0.18μm CMOS for embedded AES-based cryptographic and biometric processing", Jun. 2005, DAC '05: Proceedings of the 42nd annual Design Automation Conference, Publisher: ACM, pp. 222-227.*

* cited by examiner

*Primary Examiner* — Eleni Shiferaw
*Assistant Examiner* — Courtney Fields
(74) *Attorney, Agent, or Firm* — Dillon & Yudell, LLP

(57) ABSTRACT

An encryption method encrypts a clear text twice using a first encryption engine to produce a first cipher text and a second encryption engine to produce a second cipher text. The method compares the first cipher text with the second cipher text, or compares a checksum of the first cipher text with a checksum of the second cipher text. If the comparison succeeds, the method transmits the data. In some embodiments, the method uses a first instance of an encryption key to produce the first cipher text and a second instance of the encryption key to produce the second cipher text.

16 Claims, 7 Drawing Sheets

ENCRYPTION DATA INTEGRITY CHECK WITH DUAL PARALLEL ENCRYPTION ENGINES

BACKGROUND OF THE INVENTION

1. Technical Field

The present invention relates generally to the field of data encryption, transmission, storage, and decryption, and more particularly, to a method using dual parallel encryption engines to provide additional integrity checks in the encryption, transmission, storage, and decryption of data.

2. Description of the Related Art

Encryption is required to ensure the security of data. Large numbers of products and technologies, such as computer systems, networks, communication systems and devices, tape drives, disk drives, PDAs, cell phones, etc., use encrypted data and data encryption technologies.

Data encryption entails the transformation of clear text data into cipher text data. Encryption, transmission, storage, reading from storage and decryption involve many steps. Errors in or corruption of the data may occur at any step in the process between encryption and decryption. While the prior art provides some methods for detecting errors or corruption, the errors or corruption may be detected too late for the original data to be recovered. Also, current methods do not check for errors that may occur at each stage of the process.

SUMMARY OF THE INVENTION

The present invention provides an encryption method. Embodiments of the present invention encrypt a clear text twice using a first encryption engine to produce a first cipher text and a second encryption engine to produce a second cipher text. The method compares the first cipher text with the second cipher text. If the first cipher text and said second cipher text match, the method transmits one of the cipher texts. In some embodiments, the method uses a first instance of an encryption key to produce the first cipher text and a second instance of the encryption key to produce the second cipher text.

In some embodiments, the method of the present invention generates a first checksum of the clear text and appends the first checksum to the clear text prior to the encrypting steps. The method may generate a second checksum of the cipher text to be transmitted and appends the second checksum to the cipher text prior to transmission. In some embodiments, the method generates the second checksum after comparing said first cipher text with said second cipher text. In other embodiments, the method generates a second checksum of the first cipher text and compares it to a second checksum of the second cipher text.

Embodiments of the method may check the second checksum after transmitting the cipher texts and store the cipher text if the second checksum is valid. The method may read and decrypt the stored cipher text. The method may then check the first checksum. If the first check sum is valid, the decrypted cipher text may be used.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 7 is a flow diagram of a third embodiment of an encryption method according to the present invention; and.

DETAILED DESCRIPTION OF THE PREFERRED EMBODIMENT

Figure 1:
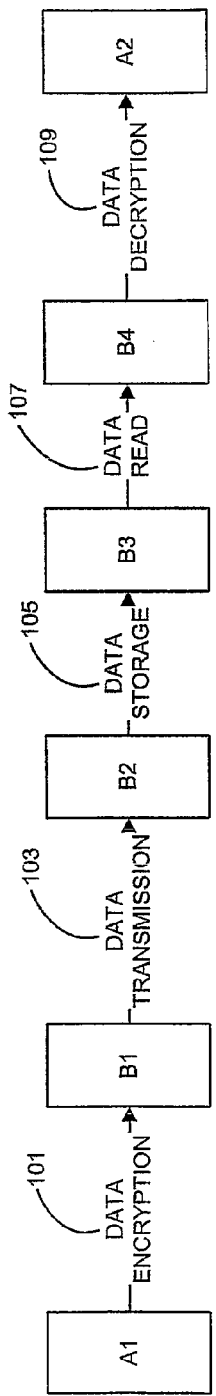
FIG. 1 is a flow diagram of an encryption method according to the prior art.

Referring now to the drawings, and first to FIG. 1, in a basic encryption system according to the prior art, a clear text A1 is encrypted at step 101, using any one of several well-known encryption engines, to produce a cipher text B1. Cipher text B1 is transmitted at step 103. Cipher text B1 may be transmitted to a recipient or to a storage device. Cipher text B1 is received as cipher text B2, which may or may not be identical to cipher text B1. Cipher text B2 is then stored at step 105 as cipher text B3. Again, cipher text B3 may or may not be identical to cipher text B2. Cipher text B3 may be read at step 107 as cipher text B4. Then, cipher text B4 may be decrypted, at step 109, to produce clear text A2. Corruption or errors may occur at any of steps 101-109. Thus, clear text A2 may not be the same as clear text A1. In the embodiment of FIG. 1, it is impossible to tell where the corruption or error occurred.

Figure 2:
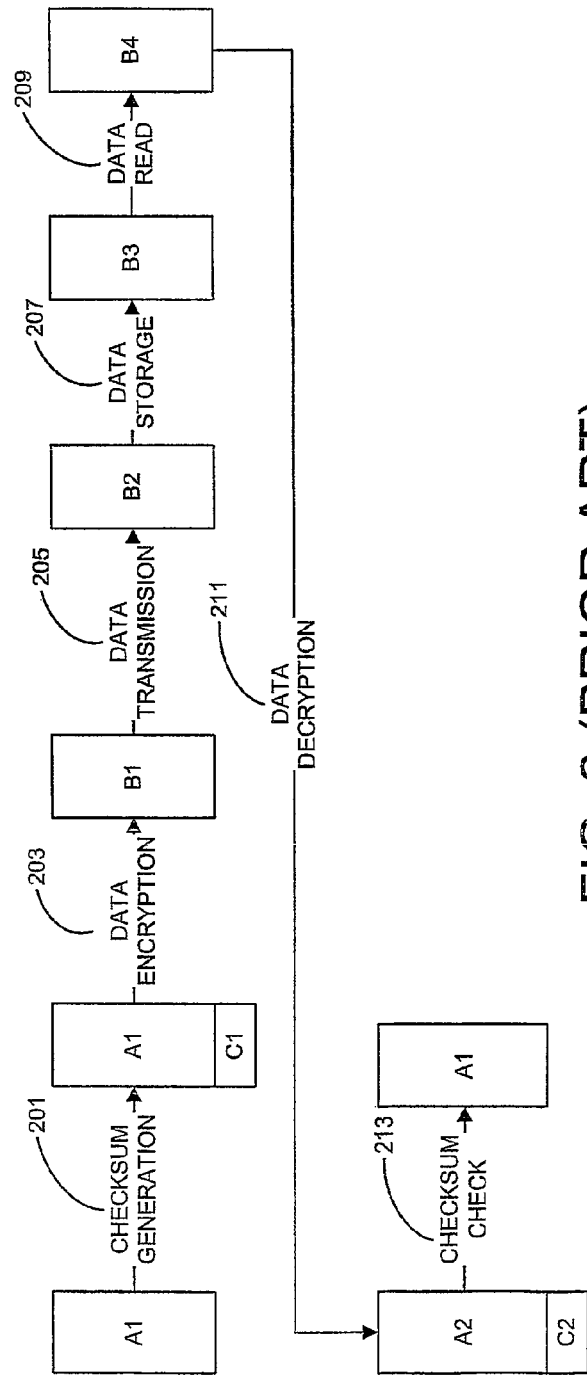
FIG. 2 is a flow diagram of a second encryption method according to the prior art.

FIG. 2 illustrates an improvement of the prior art over the system of FIG. 1. A checksum C1 of clear text A1 is generated, at step 201. As used in this disclosure, the term checksum is intended to mean any suitable hash function. Checksum C1 is appended to clear text A1. Then, clear text A1, with checksum C1 appended thereto, is encrypted at, step 203, to yield cipher text B1. Cipher text B1 is then transmitted, at step 205, and is received as cipher text B2. Cipher text B2 may be stored, at step 207 as cipher text B3. Cipher text B3 may then be read, at step 209, to produce cipher text B4. Cipher text B4 may then be decrypted, at step 211, to yield clear text A2 with checksum C2 appended thereto. The method performs a checksum check, at step 213. If checksum C2 is valid, then the resulting clear text A2 is identical to the starting clear text A1. If checksum C2 is not valid, then an error or corruption has occurred at one or more of steps 203-209.

Figure 3:
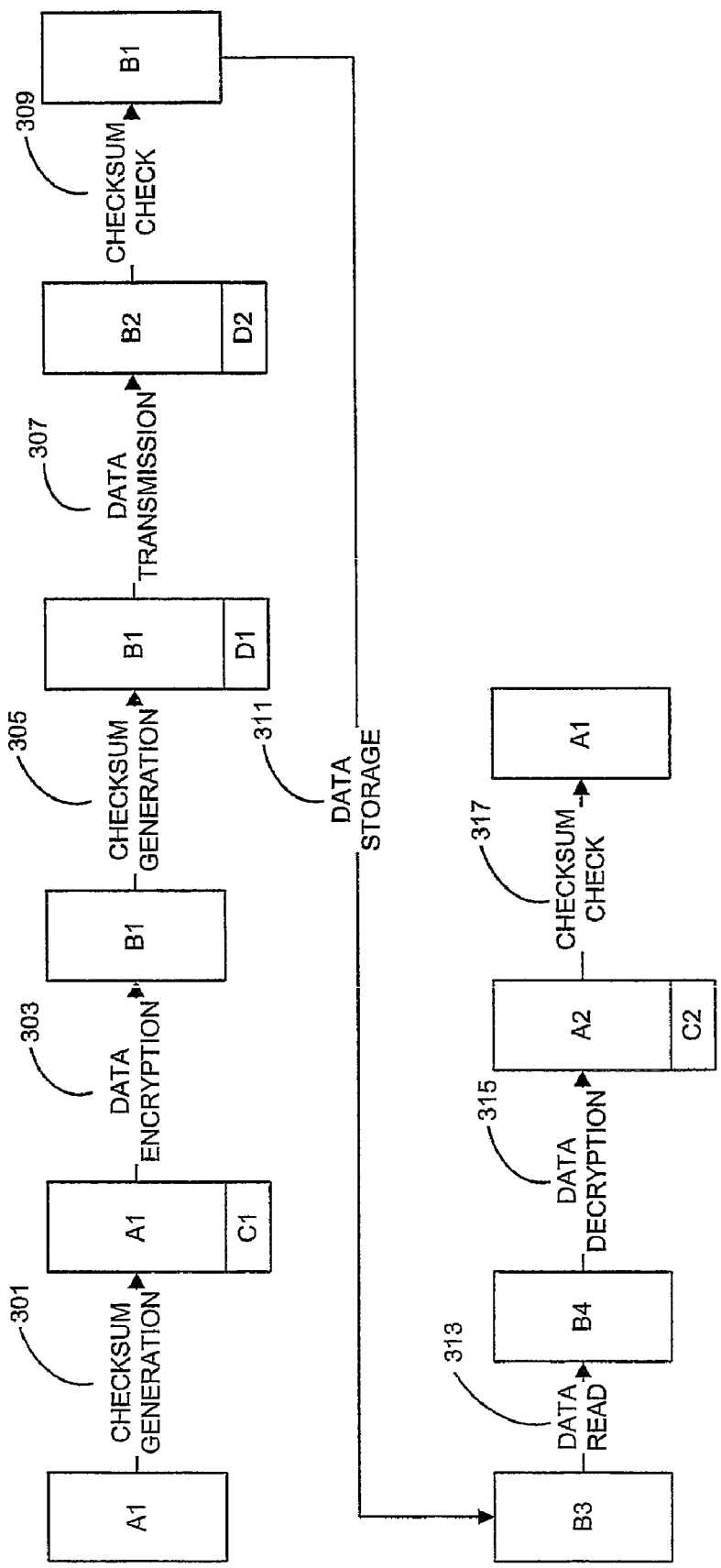
FIG. 3 is a flow diagram of a third encryption method according to the prior art.

FIG. 3 illustrates a further improvement according to the prior art. A checksum C1, or other suitable hash function, of clear text A1 is generated at step 301. Checksum C1 is appended to clear text A1. Then, clear text A1, with checksum C1 appended thereto, is encrypted, at step 303, to yield cipher text B1. Then, a second checksum D1, other suitable hash function, is generated on cipher text B1, at step 305, and appended to cipher text B1. Cipher text B1, with checksum D1 appended thereto, is then transmitted, at step 307, and is received as cipher text B2 with checksum D2 appended thereto. Cipher text B2 may or may not be identical to transmitted cipher text B1. Likewise, checksum D2 may or may not be identical to transmitted checksum D1. The method performs a checksum check, at step 309. If the checksum is valid, received cipher text B2 is identical to transmitted cipher text B1. If not, then an error occurred in transmission. Cipher text B1 may then be retransmitted. After a successful checksum check at step 309, cipher text B1 may be stored, at step 311 as cipher text B3. Cipher text B3 may then be read, at step 313, to produce cipher text B4. Cipher text B4 may then be decrypted, at step 315, to yield clear text A2 with checksum C2 appended thereto. The method performs a checksum check, at step 317. If checksum C2 is valid, then the resulting clear text A1 is identical to the starting clear text A1. If checksum C2 is not valid, then an error or corruption has occurred at one or more of steps other than data transmission step 307. However, it is impossible to determine where the error or corruption occurred.

Figure 4:
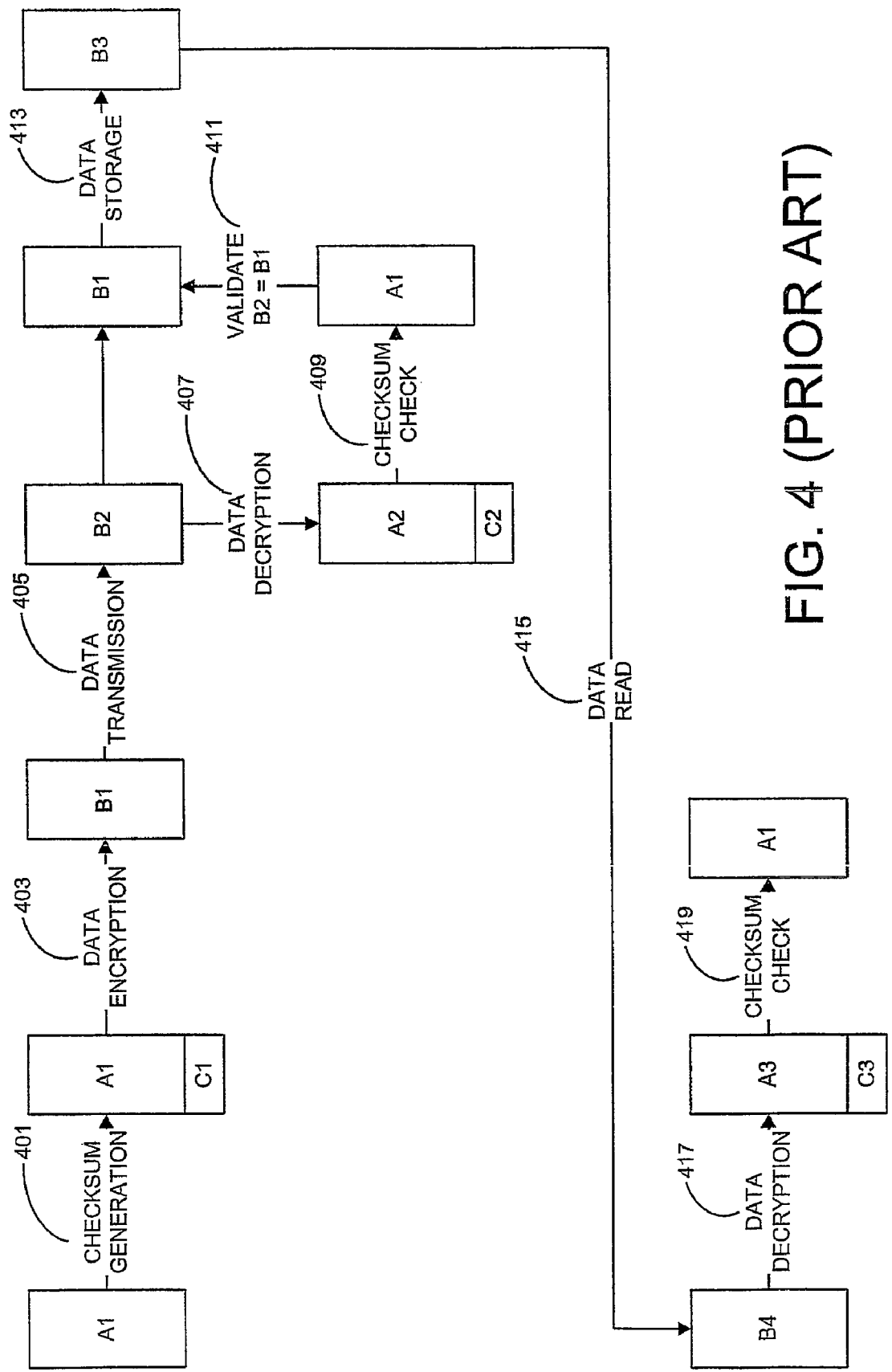
FIG. 4 is a flow diagram of a fourth encryption method according to the prior art.

FIG. 4 illustrates a further improvement according to the prior art. A checksum C1, or other suitable hash function, of clear text A1 is generated at step 401. Checksum C1 is appended to clear text A1. Then, clear text A1, with checksum C1 appended thereto, is encrypted at step 403 to yield cipher text B1. Cipher text B1 is then transmitted, at step 405, and is received as cipher text B2. Cipher text B2 is then decrypted, at step 407, to yield clear text A2 with checksum C2 appended thereto. The method performs a checksum check, at step 409. If checksum C2 is valid, then clear text A2 is identical to clear text A1. Thus, as indicated at 411, cipher text B2 is validated as being the same as transmitted cipher text B1. Then, cipher text B1 may be stored, at step 413, as cipher text B3. Cipher text B3 may then be read, at step 415, to produce cipher text B4. Cipher text B4 may then be decrypted, at step 417, to yield clear text A3 with checksum C3 appended thereto. The method performs a checksum check, at step 419. If checksum C3 is valid, then the resulting clear text A3 is identical to the starting clear text A1. If checksum C3 is not valid, then an error or corruption has occurred at one or more of steps 413 and 417.

Figure 5:
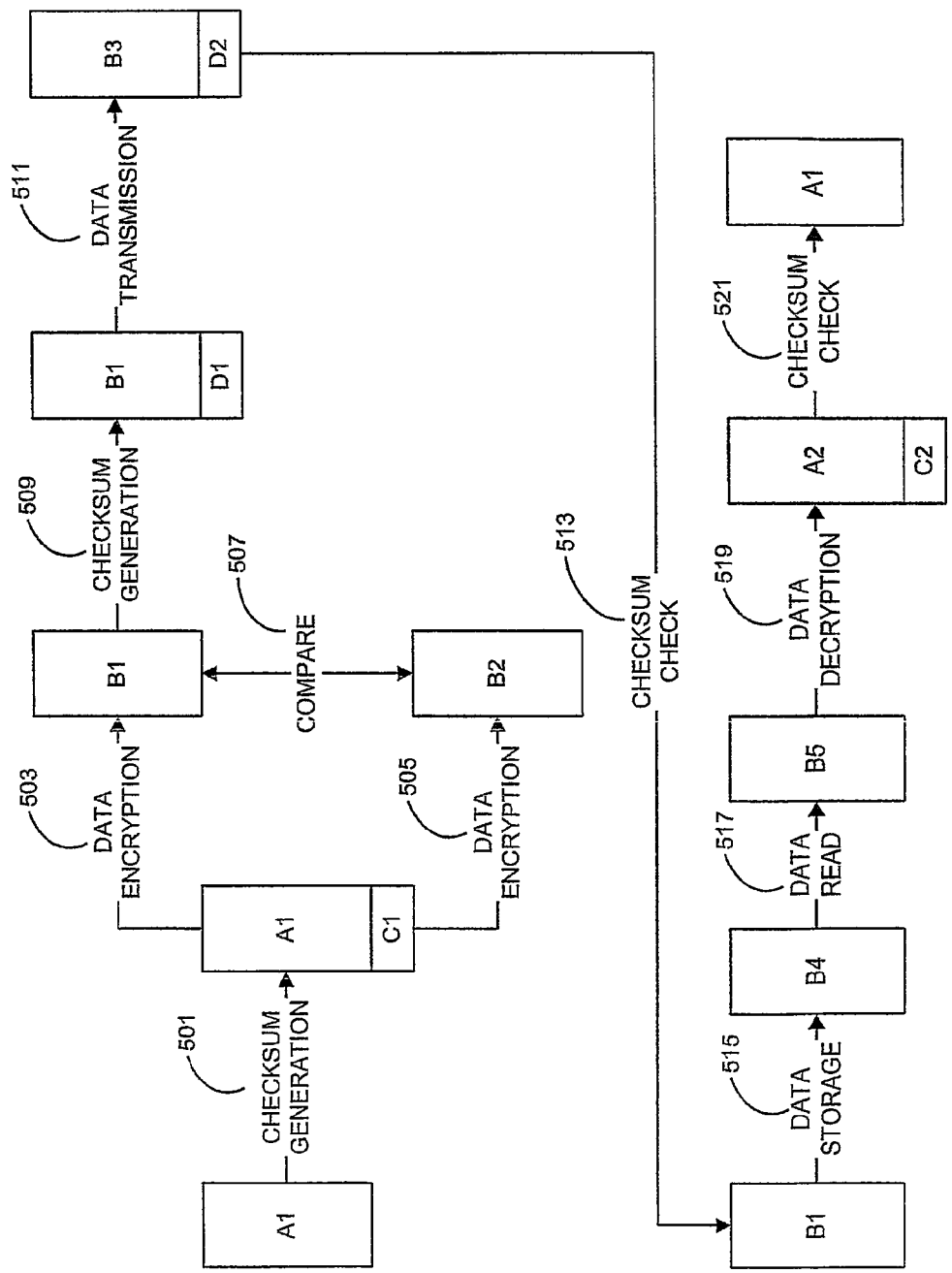
FIG. 5 is a flow diagram of one embodiment of an encryption method according to the present invention.

FIG. 5 illustrates one embodiment of a method according to the present invention. A checksum C1, or other suitable hash function, of clear text A1 is generated at step 501. Checksum C1 is appended to clear text A1. Then, clear text A1, with checksum C1 appended thereto, is encrypted with a first encryption engine, at step 503, to yield a first cipher text B1. Clear text A1 with checksum C1 appended thereto is also encrypted with a second encryption engine, at step 505, using the same encryption key as the first encryption engine to yield a second cipher text B2. Then, first cipher text B1 and second cipher text B2 are compared, at step 507. If first cipher text B1 and second cipher text B2 match, which indicates that no errors have occurred during encryption, the method generates a checksum D1, or other suitable hash function, at step 509, and appends checksum D1 to cipher text B1. It should be recognized that since cipher text B1 and B2 identical, checksum D1 may alternatively be generated on and appended to cipher text B2. Cipher text B1, with checksum D1 appended thereto, is then transmitted, at step 511, and is received as cipher text B2 with checksum D2 appended thereto. The method performs a checksum check, at step 513. If the checksum is valid, received cipher text B3 is identical to transmitted cipher text B1. After a successful checksum check at step 513, cipher text B1 may be stored, at step 515 as cipher text B4. Cipher text B4 may then be read, at step 517, to produce cipher text B5. Cipher text B5 may then be decrypted, at step 519, to yield clear text A2 with checksum C2 appended thereto. The method performs a checksum check, at step 521. If checksum C2 is valid, then the resulting clear text A2 is identical to the starting clear text A1.

Figure 6:
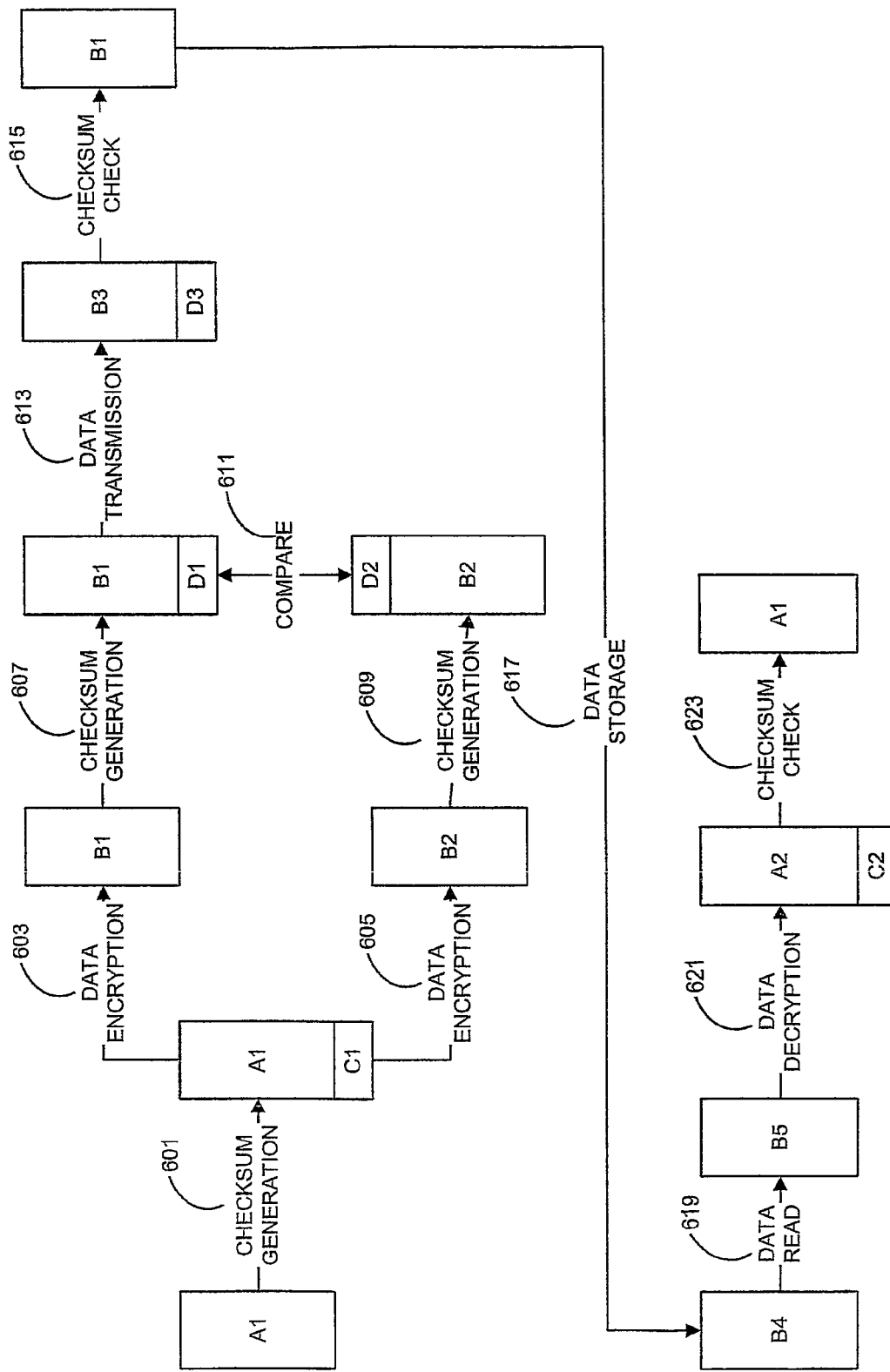
FIG. 6 is a flow diagram of a second embodiment of an encryption method according to the present invention.

FIG. 6 illustrates a second embodiment of a method according to the present invention. A checksum C1, or other suitable hash function, of clear text A1 is generated at step 601. Checksum C1 is appended to clear text A1. Then, clear text A1, with checksum C1 appended thereto, is encrypted with a first encryption engine, at step 603, to yield a first cipher text B1. Clear text A1 with checksum C1 appended thereto was also encrypted with a second encryption engine, at step 605 to yield a second cipher text B2. The method then generates a checksum D1, or other suitable hash function, at step 607, and appends checksum D1 to cipher text B1. The method also generates a checksum D2, or other suitable hash function, at step 609, and appends checksum D2 to cipher text B2. Then, the method compares checksum D1 with checksum D2, at step 611. If checksums D1 and D2 match then cipher text B1, with checksum D1 appended thereto, is transmitted, at step 613, and is received as cipher text B3 with checksum D3 appended thereto. The method performs a checksum check, at step 615. If the checksum is valid, received cipher text B3 is identical to transmitted cipher text B1. After a successful checksum check at step 615, cipher text B1 may be stored, at step 617, as cipher text B4. Cipher text B4 may then be read, at step 619, to produce cipher text B5. Cipher text B5 may then be decrypted, at step 621, to yield clear text A2 with checksum C2 appended thereto. The method performs a checksum check, at step 623. If checksum C2 is valid, then the resulting clear text A2 is identical to the starting clear text A1.

The embodiments of FIGS. 5 and 6 thus detect at the outset if errors or corruption have occurred during the encryption of clear text A1. It is improbable that two independent encryption engines would have made the same errors in encrypting the clear text. However, if the encryption key the engines use is corrupted, the error-free cipher texts produced will be identical, but they will not be able to be decrypted with an uncorrupted key. Accordingly, below there is described alternative embodiments in which integrity of the encryption key is assured.

Figure 7:
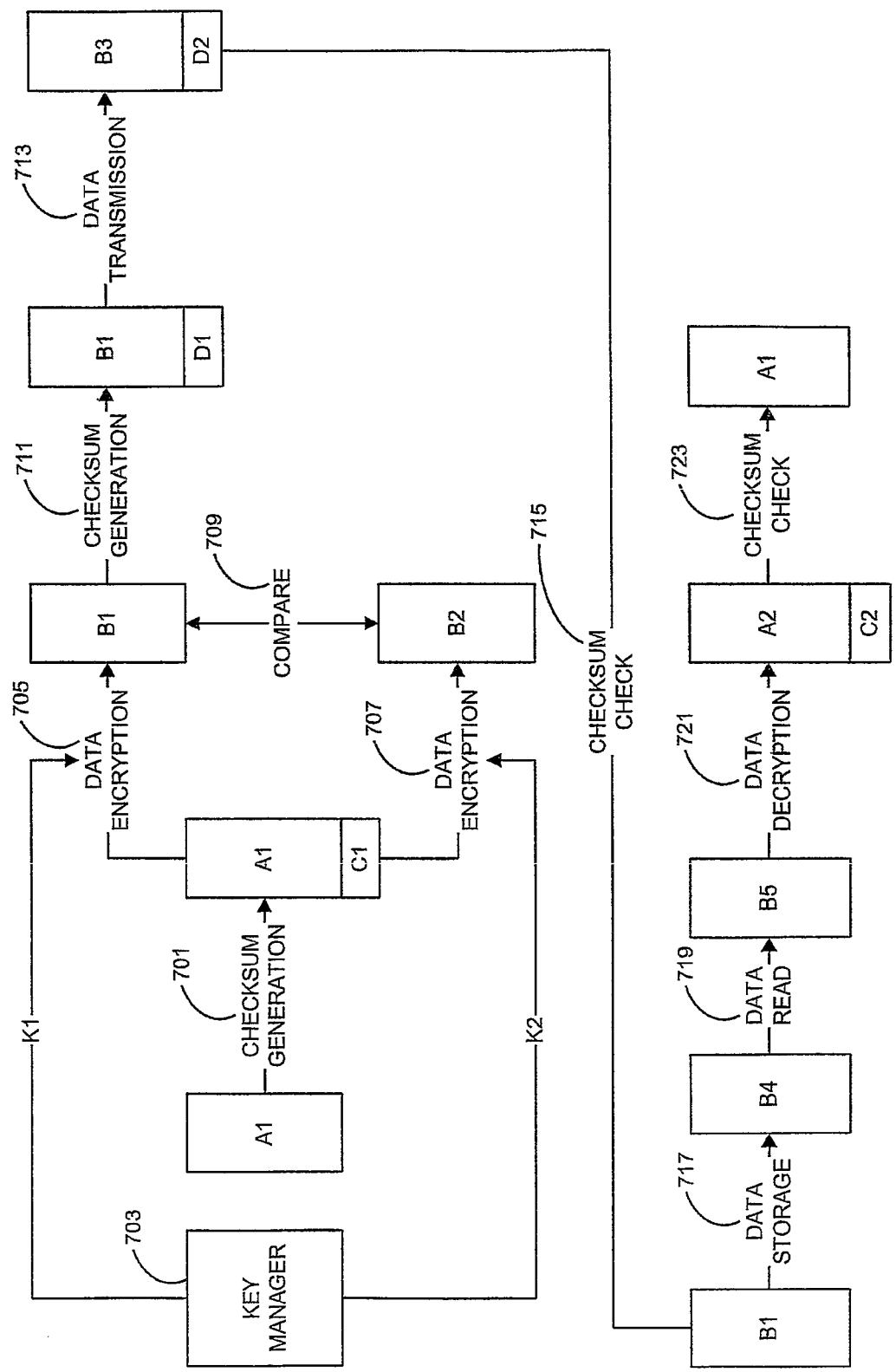

FIG. 7 illustrates a further alternative embodiment of a method according to the present invention. A checksum C1, or other suitable hash function, of clear text A1 is generated at step 701. Checksum C1 is appended to clear text A1. In the embodiment of FIG. 7, a key manager 703 provides a first instance K1 of an encryption key to a first encryption engine and a second instance K2 of the encryption key to a second encryption engine. Instances K1 and K2 should be identical. Then, the method encrypts clear text A1, with checksum C1 appended thereto, with the first encryption engine, at step 705, using encryption key instance K1 to yield a first cipher text B1. The method also encrypts clear text A1 with checksum C1 appended thereto with the second encryption engine, at step 707, using encryption key instance K2 to yield a second cipher text B2. Then, the method compares first cipher text B1 and second cipher text B2, at step 709. If first cipher text B1 and second cipher text B2 match, which indicates that encryption keys K1 and K2 are identical and valid, and no errors have occurred during encryption, the method generates a checksum D1, or other suitable hash function, at step 711, and appends checksum D1 to cipher text B1. The method then transmits cipher text B1, with checksum D1 appended thereto, at step 713. Cipher text B1 and checksum D1 are received as cipher text B2 and checksum D2, respectively. The method performs a checksum check, at step 715. If the checksum is valid, received cipher text B3 is identical to transmitted cipher text B1. After a successful checksum check at step 715, cipher text B1 may be stored, at step 717, as cipher text B4. Cipher text B4 may then be read, at step 719, to produce cipher text B5. Cipher text B5 may then be decrypted, at step 721, to yield clear text A2 with checksum C2 appended thereto. The method performs a checksum check, at step 723. If checksum C2 is valid, then the resulting clear text A2 is identical to the starting clear text A1.

Figure 8:
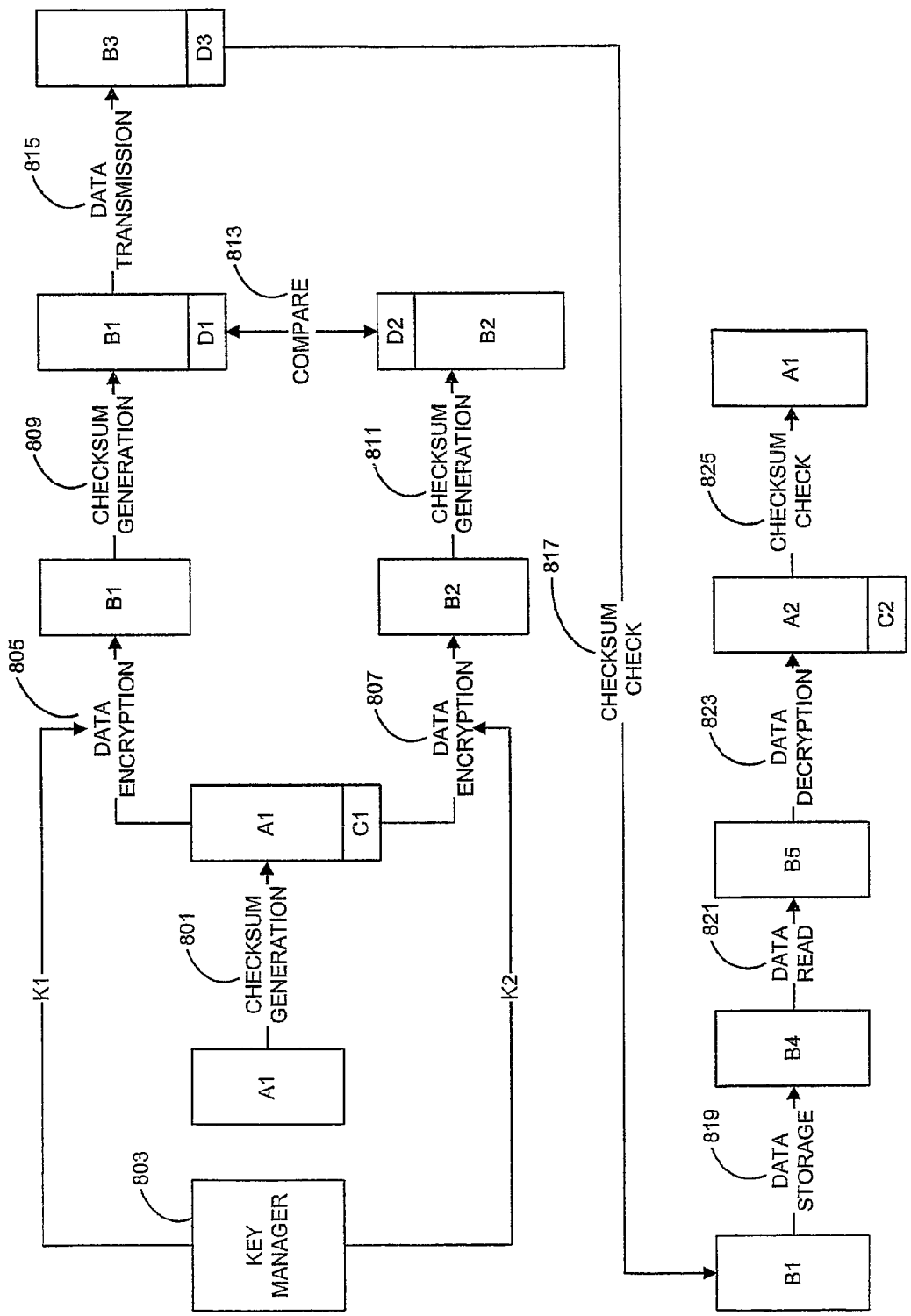
FIG. 8 is a flow diagram of a fourth embodiment of an encryption method according to the present invention.

FIG. 8 illustrates yet a further alternative embodiment of a method according to the present invention. A checksum C1, or other suitable hash function, of clear text A1 is generated at step 801. Checksum C1 is appended to clear text A1. A key manager 803 provides a first instance K1 of an encryption key to a first encryption engine and a second instance K2 of the encryption key to a second encryption engine. Then, the method encrypts clear text A1, with checksum C1 appended thereto, with the first encryption engine, at step 805, using encryption key instance K1 to yield a first cipher text B1. The method also encrypts clear text A1 with checksum C1 appended thereto with a second encryption engine, at step 807, using encryption key instance K2 to yield a second cipher text B2. The method then generates a checksum D1, or other suitable hash function, at step 807, and appends checksum D1 to cipher text B1. The method also generates a checksum D2, or other suitable hash function, at step 811, and appends checksum D2 to cipher text B2. Then, the method compares checksum D1 with checksum D2, at step 813. If the checksums match then cipher text B1, with checksum D1 appended thereto, is then transmitted, at step 815, and is received as cipher text B3 with checksum D3 appended thereto. The method performs a checksum check, at step 817. If the checksum is valid, received cipher text B3 is identical to transmitted cipher text B1. After a successful checksum check, at step 817, cipher text B1 may be stored, at step 817, as cipher text B4. Cipher text B4 may then be read, at step 821, to produce cipher text B5. Cipher text B5 may then be decrypted, at step 823, to yield clear text A2 with checksum C2 appended thereto. The method performs a checksum check, at step 825. If checksum C2 is valid, then the resulting clear text A2 is identical to the starting clear text A1.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of providing integrity checks during data encryption, the method comprising:
   encrypting a clear text by a first encryption engine using a first instance of an encryption key provided by a key manager to produce a first cipher text;
   encrypting said clear text by a second encryption engine using a second, different instance of said encryption key to produce a second cipher text, wherein the second, different intance is provided by the key manager independent of the first instance of the encryption key;
   determining whether the first instance of the encryption key and the second, different instance of the encryption key are identical and valid by comparing said first cipher text with said second cipher text; and
   in response to the first cipher text and the second cipher text matching, indicating that the encryption keys are identical and valid and that no errors have occurred during encryption of said clear text, generating a cipher text checksum and appending the cipher text checksum to one of the first cipher text and the second cipher text.

2. The method as claimed in claim 1, further comprising:
   transmitting said one of said first cipher text and said second cipher text to which the cipher text checksum is appended; and
   storing one of said first cipher texts and said second cipher text if said cipher text matches said second cipher text.

3. The method as claimed in 2, further comprising:
   generating a first checksum on said clear text prior to said encrypting steps, wherein said first checksum is generated using a hash function;
   reading said stored cipher text;
   decrypting the cipher text that is read; and
   checking said first checksum after said decrypting step.

4. The method as claimed in claim 3, further comprising:
   generating the cipher text checksum as a second checksum for said one of said first cipher text and said second cipher text prior to said transmitting step; and
   checking said second checksum to ensure data integrity of the cipher text prior storing the cipher text.

5. The method as claimed in claim 1, wherein said comparing comprises:
   generating a first checksum of said first cipher text;
   generating a second checksum of said second cipher text; and
   comparing said first and second checksums.

6. A method of encrypting data, the method comprising:
   encrypting a clear text by a first encryption engine using a first instance of an encryption key to produce a first cipher text;
   encrypting said clear text by a second encryption engine using a second instance of said encryption key to produce a second cipher text, wherein the second instance is provided independent of the first instance of the encryption key;
   determining (a) whether the first instance of the encryption key and the second, different instance of the encryption key are identical and valid and (b) whether the encryption engines did not produce any errors during encryption of the clear text by comparing said first cipher text with said second cipher text; and
   storing one of said cipher texts if said first cipher text matches said second cipher text, which indicates that the encryption keys are identical and valid and that the encryption engines did not produce any errors during encryption.

7. The method as claimed in claim 6, further comprising:
   reading said stored cipher text; and
   decrypting said read cipher text.

8. The method as claimed in 7, further comprising:
   generating a first checksum on said clear text prior to said encrypting steps; and
   checking said first checksum after said decrypting step to ensure data integrity.

9. The method as claimed in claim 8, further comprising:
   transmitting said one of said cipher texts prior to said storing step.

10. The method as claimed in claim 9, further comprising:
    generating a second checksum on said one of said cipher texts prior to said transmitting step; and
    checking said second checksum prior to said storing step to ensure data integrity.

11. The method as claimed in claim 6, wherein said comparing comprises:
    generating a first checksum of said first cipher text;
    generating a second checksum of said second cipher text; and comparing said checksum of said first cipher text with said checksum of said second cipher text to ensure encryption integrity, wherein encryption integrity is verified when the first checksum matches the second checksum.

12. An encryption method, which comprises:

encrypting a clear text by a first encryption engine using a first instance of an encryption key to produce a first cipher text;

encrypting said clear text by a second encryption engine using a second instance of said encryption key to produce a second cipher text, wherein the second, different instance is provided by a key manager independent of the first instance of the encryption key;

determining (a) whether the first instance of the encryption key and the second, different instance of the encryption key are identical and valid and (b) whether the encryption engines did not produce any errors during encryption of the clear text by comparing said first cipher text with said second cipher text;

in response to the first cipher text and the second cipher text matching, indicating that the encryption keys are identical and valid and that no errors have occurred during encryption of said clear text, generating a cipher text checksum and appending the cipher text checksum to one of the first cipher text and the second cipher text; and transmitting one of said cipher texts if said first cipher text and said second cipher text match.

13. The method as claimed in claim 12, wherein said comparing comprises:

generating a checksum of said first cipher text;

generating a checksum of said second cipher text;

and comparing said checksum of said first cipher text with said checksum of said second cipher text.

14. The method as claimed in claim 13, wherein said transmitting comprises:

transmitting one of said cipher texts if said checksum of said first cipher text and said checksum of said second cipher text match.

15. The method as claimed in claim 12, wherein said comparing comprises:

generating a checksum of said first cipher text;

generating a checksum of said second cipher text; and comparing said checksum of said first cipher text with said checksum of said second cipher text.

16. The method as claimed in claim 15, wherein said transmitting comprises:

transmitting one of said cipher texts if said checksum of said first cipher text and said checksum of said second cipher text match.

* * * * *